United States Patent [19]

Fennel

[11] Patent Number: 4,773,072
[45] Date of Patent: Sep. 20, 1988

[54] METHOD AND CIRCUIT CONFIGURATION FOR SUPPRESSING SHORT-TIME INTERFERENCES

[75] Inventor: Helmut Fennel, Bad Soden, Fed. Rep. of Germany

[73] Assignee: Alfred Teves GmbH, Frankfurt am Main, Fed. Rep. of Germany

[21] Appl. No.: 865,897

[22] Filed: May 21, 1986

[30] Foreign Application Priority Data

May 21, 1985 [DE] Fed. Rep. of Germany ....... 3518105

[51] Int. Cl.$^4$ .................. G06F 11/20; B60T 8/88
[52] U.S. Cl. .................................. 371/68; 371/9; 364/187; 364/426.02; 364/426.03; 303/92
[58] Field of Search ............... 371/9, 68, 5, 8, 67; 364/426, 200, 900, 186, 187; 303/92, 95

[56] References Cited

U.S. PATENT DOCUMENTS

| | | | |
|---|---|---|---|
| 3,618,015 | 11/1971 | Homonick | 371/68 X |
| 4,113,321 | 9/1978 | Bleckmann | 303/92 |
| 4,198,678 | 4/1980 | Maatje | 371/68 X |
| 4,358,823 | 11/1982 | McDonald | 371/68 X |
| 4,493,210 | 1/1985 | Fries | 303/92 X |
| 4,546,437 | 10/1985 | Bleckmann | 364/426 |
| 4,566,101 | 1/1986 | Skonieczny | 371/68 X |

Primary Examiner—Jerry Smith
Assistant Examiner—Robert W. Beausoliel
Attorney, Agent, or Firm—James B. Raden; Robert P. Seitter

[57] ABSTRACT

A method and a circuit configuration for suppressing sporadic interferences in the processing of data by means of two circuit systems (2, 3, MC1, MC2). The circuit systems redundantly process the data and, for the purpose of detecting errors and interferences, between the circuit systems data (D1n, D2n) is exchanged and compared for agreement. If the comparators (15, 16, 25', 41.2, 43.1, 46.2, 49.1) detect differences the transferred data will be taken over and the data processing will be continued with the transferred data. This takes place in several consecutive cycles. As soon as the predetermined scope or a predetermined number of cycles with differences between the compared data is exceeded an error will be evaluated and indicated. The circuit configuration is suitable for increasing the tolerance of electronic control circuits (ER) of the type for slip-controlled brake systems.

14 Claims, 4 Drawing Sheets

METHOD AND CIRCUIT CONFIGURATION FOR SUPPRESSING SHORT-TIME INTERFERENCES

BACKGROUND OF THE INVENTION

The invention relates to a method for suppressing sporadic, short-time interferences in the processing of signals and data by means of electronic time-dependent computing, selecting, and combining circuits or of program-controlled circuits. With the use of microprocessors or microcomputers, the data are redundantly processed in two circuit systems, which are independent of each other, and in which the data are cyclically exchanged for the detection of errors and interferences. That is, the data are alternatively transferred from one system to the other and compared for agreement. Circuit configurations for implementing the method can be provided for controlling a slip-controlled brake system for automotive vehicles.

Such methods and circuit configurations are known. According to DE-OS (German Printed Patent Application) No. 32 34 637 inductive transducers are arranged at the vehicle wheels or at the axles for the control of a brake slip control system. The inductive transducers emit signals whose frequency and frequency changes represent the wheel rotational behavior. The signals are redundantly processed by means of two electronic circuit systems such as microcomputers, which are independent of each other. As long as there is no interference identical braking pressure control signals will be available at the outputs of the two systems. By way of output amplifiers or valve drivers, respectively, electronically operable multi-directional valves are connected to the output of one of the two systems. The multi-directional valves are inserted into the hydraulic lines between the master cylinder of the brake system and the wheel brakes and allow the braking pressure variation to be influenced for the purpose of slip control.

The two circuit systems of this known arrangement comprise comparators by means of which internal signals (i.e., signals generated within the system itself) are compared and checked for agreement with the signals of the second circuit system. The signals are exchanged between the circuit systems. If one of the two comparators notes a difference between the internal signal and the transferred signal of the other system, this will imply the disconnection of brake slip control even if this interference is but a one-time, short, and unimportant interference. Thus, in some cases, the reaction of monitoring and disconnection devices is overly sensitive.

It is thus an object of this invention to increase the error tolerance or interference tolerance in redundantly operated systems of the aforementioned type in a simple manner so as to ensure that the system automatically differentiates between sporadic, short-time, and harmless interferences and respectively real errors or interference of such a nature that might produce false results in the data processing.

SUMMARY OF THE INVENTION

It has been found out that this object is achieved in a simple, technically advanced manner in a method of the type described above including a further development wherein in case of differences between the compared data, between the transferred data and the data momentarily existing in the system, the data processing is continued on the basis of the transferred data and wherein an interference is not indicated until differences have been detected between the compared data in a predetermined number of program cycles. According to an advantageous embodiment of the inventive method, in case of but a partial agreement of the compared data, only the differing data will be taken over and further processed, together with the consistent data.

In other embodiments it will be advantageous to not indicate an interference until differences have been detected between the compared data of the two systems in a predetermined number of consecutive program cycles. In other cases, differences in a predetermined number of program cycles per unit of time will imply error indication or a corresponding reaction, respectively.

Further examples of embodiments of the inventive method as well as circuit configurations for implementing this method, which are particularly suitable for controlling slip-controlled automotive brake systems of the type described above, are described hereinafter.

This invention thus proceeds from the fact that in redundant systems of the aforementioned type data must be exchanged between the comparators in order to detect differences and to evaluate the differences as a criteria of interferences. If, for example, in this data transfer there are interferences the system will react as in case of real errors. This, however, is undesirable in case of sporadic, short-time interferences if there were no or only a harmless influence of the latter on the output signals. In such cases, the reaction of the monitoring device is over-sensitive. In order to achieve a greater tolerance with respect to harmless interferences, according to this invention the two redundantly operating circuit systems possibly will use the wrong data and this is deliberately tolerated over a limited, predetermined time. This will enable the entire system to maintain and to correct itself in case of the interference being sporadic and short-time and thus harmless. In case of real errors or of long-duration interferences the result of the comparison will provide an output or will provide an output after a predetermined period, respectively.

The number of comparative trials or how many program cycles with differing results of the comparisons should be admitted until it is expedient and desirable to have an indication of the interference or a reaction to the interference detected by the redundant data processing depends on the application. That is, on the respective rating of the circuit systems, for example, on the number of mathematical derivatives resulting in the data processing.

Thus according to this invention the differentiation between short-time interferences and real errors is considerably improved and thus there is a considerable improvement in the operativeness and reliability of the control unit as used, for example in combination with slip-controlled brake system.

BRIEF DESCRIPTION OF THE DRAWING

Further characteristics, advantages, and applications of this invention will become evident from the following description of one embodiment of this invention when taken in conjunction with the accompanying drawing wherein.

DETAILED DESCRIPTION

Figure 1:
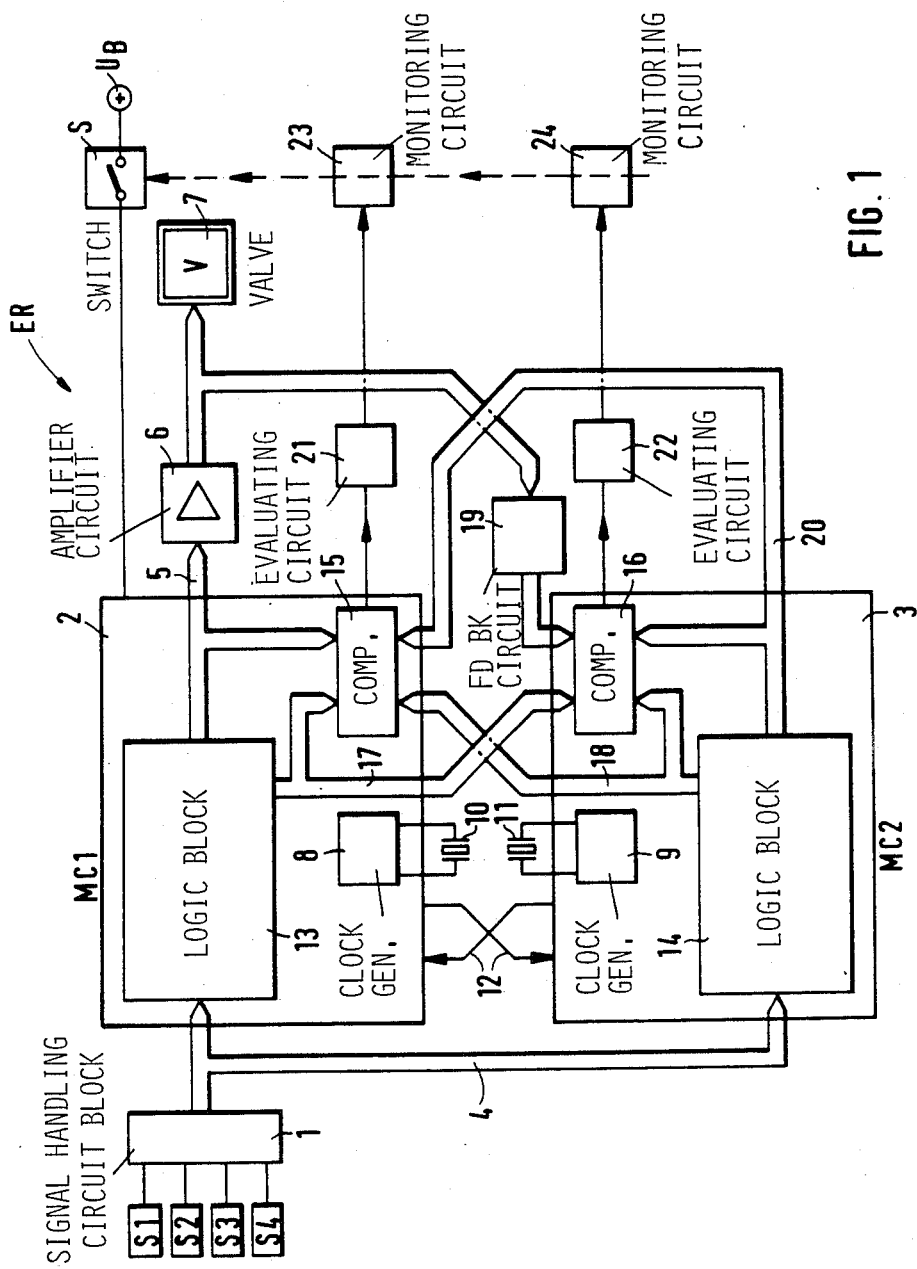
FIG. 1 is a block diagram showing the electronic control unit of a slip-controlled brake system.

FIG. 1 shows the configuration of an electronic control circuit ER for a slip-controlled automotive brake system as an example of applying the method of the present invention. In this application each wheel of the vehicle is provided with a sensor S1–S4 serving as a transducer and generating a signal whose frequency is representative of the wheel rotational behavior. Each sensor S1–S4 feeds the signal into a signal handling circuit 1. In block 1 the signals are amplified, filtered, and converted into binary signals or data, respectively, and which are suited for the subsequent data processing. In two identical circuit systems 2, 3 which also may be designed in the form of program-controlled circuits, in particular microprocessors MC1, MC2, the handled sensor signals, which are fed in parallel into the two circuit systems 2, 3 or microcomputers MC1, MC2 by way of a multiple line 4, are redundantly processed.

By way of an amplifier circuit or a valve driver 6, respectively, electromagnetically operable hydraulic multi-directional valves 7 are connected at the output 5 of one of the two circuit systems (2). The valves are inserted in a known manner (not illustrated) into the pressure medium paths between a master cylinder and the wheel brakes of an automotive vehicle so that it is possible to control the slip to an optimum value, which is detected by the circuit systems 2, 3 and which depends on the wheel rotational behavior, by keeping the braking pressure constant, by reducing it, and by increasing it. The block 7 symbolizes a plurality of electromagnetically operable multi-directional valves. It is well known to use one inlet valve and one outlet valve each per wheel or per control circuit.

The cycle of the two circuit systems 2, 3 is determined by the clock generator 8, 9 in combination with quartz crystals 10, 11 and is rated, for example, at 10 MHz. The two microcomputers 2, 3 are synchronized by way of alternating signal paths 12.

Within the system 2, 3 there are logic blocks 13, 14 as well as comparators 15, 16. By way of signal paths 17, 18, internal signals (characterizing, for example, the velocity of the individual wheels and/or the momentary control phase, that is "keep pressure constant", "reduce pressure", "increase pressure") are respectively exchanged and transferred to the comparator 16 or 15, respectively, of the parallel circuit system 3 or 2, respectively. Further, by way of the valve driver 6 and a feed-back circuit 19, the valve control signals are transferred from the output 5 of the valve-controlling circuit system 2 to the comparator of the second circuit system (3) on the one hand, and from the output 20 of the second circuit system (3) to the comparator 15 of the first system 2. Thus, in this embodiment, both internally generated and external valve control signals are checked for agreement.

By way of counting and evaluating circuits 21, 22, the output signals of the comparators 15, 16 lead to monitoring circuits 23, 24. The monitoring circuits as symbolically represented by the switch S will interrupt the electric power supply $U_B$ of the illustrated control unit as soon as there is a response of either of the two monitoring circuits 23, 24. Thereby, the brake system will switch over to uncontrolled operation.

Figure 2:
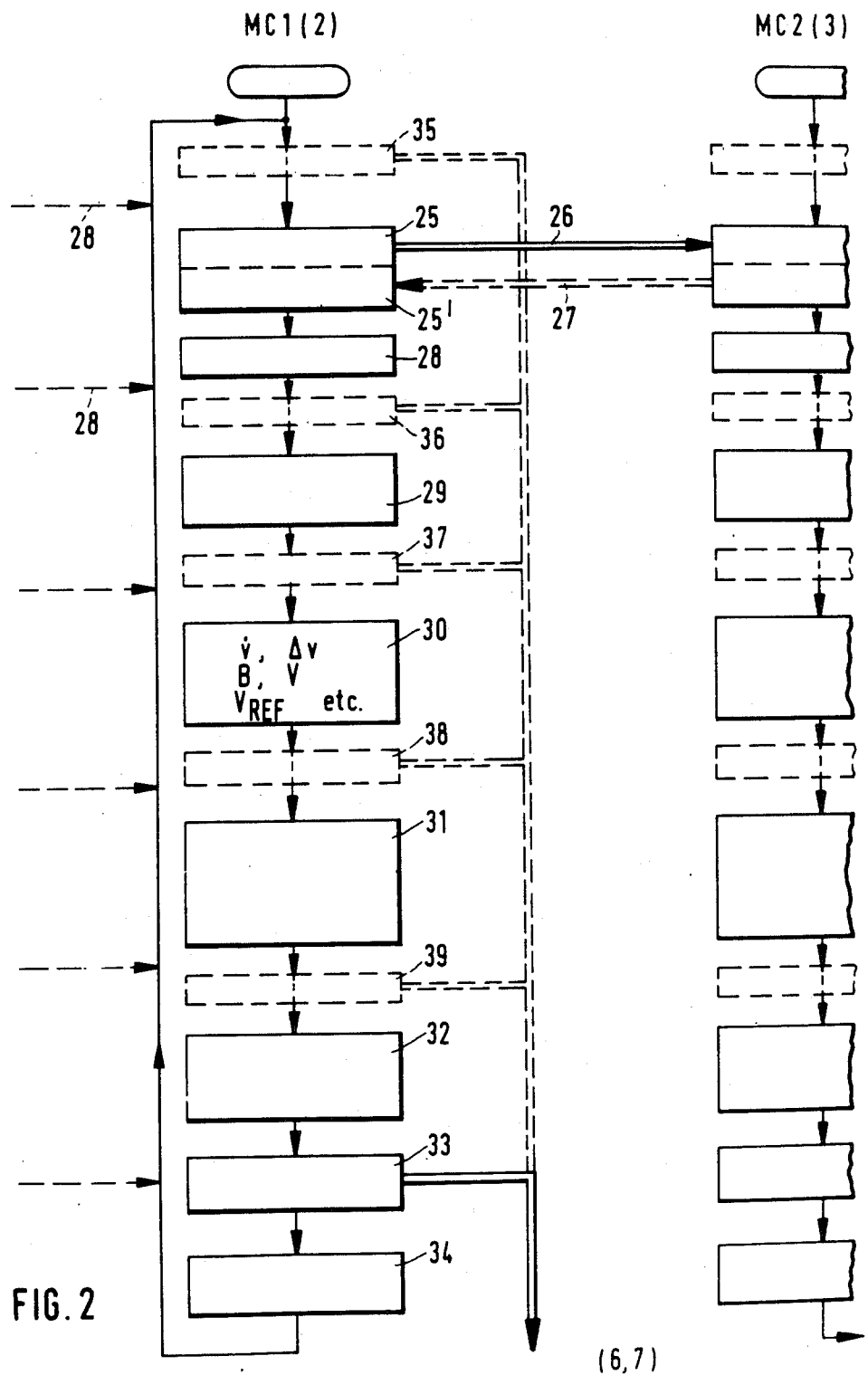
FIG. 2 is a flow chart of a data processing by means of the circuit systems of FIG. 1.

In one embodiment, the handled sensor data will be processed chronologically one after the other in the circuit systems 2, 3. FIG. 2 shows one example of such a flow chart which is passed cyclically in the described embodiment at intervals of seven milliseconds. At the beginning of a cycle (the blocks 35 ff illustrated by broken lines and representing the valve activation will be explained hereinafter), which is initiated, for example by an interrupt signal, certain characteristic data symbolized by the block 25 and determined and stored in the preceding cycle are transferred from the circuit system MC1 (in this instance the system MC1 being system or microcomputer 2 of FIG. 1) to the second circuit system MC2 as indicated by arrow 26. In the next cycle, the direction of transfer will be reversed which is expressed by the arrow 27 illustrated by broken lines. In the described embodiment of this invention the vehicular reference velocity as well as the control phase momentarily applying to each wheel and the momentary deviation of the wheel velocity from the reference (i.e., from the vehicular reference velocity), likewise were chosen for each wheel, as characteristic values. Subsequently (block 28), the positions of the individual valves will be checked.

The next step, block 29, serves to determined or actualize, respectively, the velocity of each individual wheel, thereupon in block 30 the acceleration $\dot{v}$, the deviations delta v of the wheel velocities from the reference, the acceleration-and-velocity switching thresholds B, V, and further control values being determined. The next step 31 within this cycle is reserved for the wheel-individual classification of the "control phase", of the most favorable pressure reduction algorithm or pressure build-up algorithm as a function of the control data previously measured and determined. Thereafter, as symbolized by block 32, warning switches will be checked, which, for example, monitor the pressure of the auxiliary pressure supply system and the fluid level of the pressure compensation reservoir, and further system-specific switching-off criteria are checked.

In the step represented by block 33, the results of the preceding computations will finally be transformed into a corresponding valve activation. The valve activation, on its part, will influence the further braking pressure variation in the hydraulic brake system of the vehicle. The subsequent waiting time, step 34, will bridge the period until the beginning of the next cycle or rather until the new run of the operations illustrated in FIG. 2. This waiting time whose duration will vary is necessary also because, depending on the situation, varying times are required for the preceding steps and computing processes.

The additional items 35 through 39 illustrated by broken lines refer to a further embodiment of such a circuit system where the valve actuation time within a cycle of some milliseconds of duration can be varied sensitively. To this end, a counter will be decremented at approximatively equal time intervals within the cycle, with the contents of the counter determining the valve actuation time.

The second circuit system MC2 symbolizing the system or microcomputer 3 of FIG. 1 is merely shown in outline form in FIG. 2 as it does not differ from the circuit system MC1 (2) in the arrangement and in the logical combination or rather in the programming. The direction of data exchange, symbolized by the arrows 26, 27 and the block 25, will alter from cycle to cycle as previously described.

The arrows 28 indicated by broken lines in FIG. 2 show that the signals originating from the individual wheel sensors each will lead to the interruption of the illustrated flow. The wheel sensor signals in the system MC1 or MC2 will immediately be processed and stored. If a microcomputer is used as circuit system the wheel signals 28 will be fed in by way of so-called "interrupt" inputs. The completion of the main program will be interrupted thereby and, for the time being, the interrupt program will be carried through.

Figure 3:
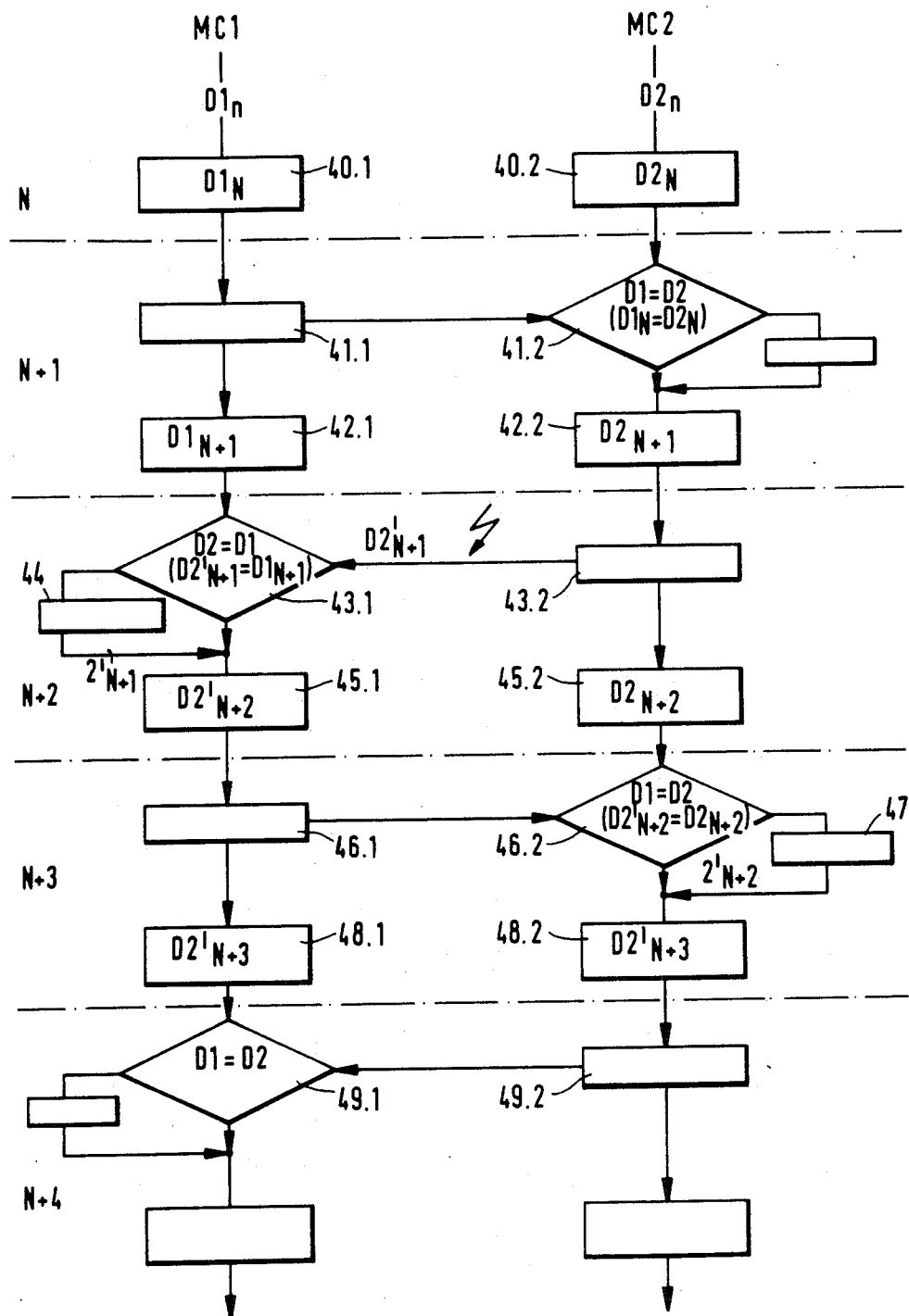
FIG. 3 is a flow chart of the data exchange and comparison of data in a data processing according to FIG. 2; and, FIG. 4 shows the variations of a velocity signal and of an acceleration signal as functions of time as well as the influence of an interference.

FIG. 3 provides a more detailed explanation of the data exchange and of the data comparison according to block 25, 25' in FIG. 2. The illustrated flow or sequence of steps covers several cycles. After processing of the data D1n, D2n in the cycle or "loop" N, illustrated by block 40.1 and 40.2, respectively, in step 41.1, the characteristic data D1N will be transferred to the second circuit system MC2 which is comparable with microprocessor 3 in FIG. 1. In the comparator 41.2 (or "comparator 16" according to FIG. 1) the transferred data D1N will be compared for agreement with the corresponding data D2N determined in the circuit system MC2. If the comparison reveals an agreement (i.e., D1=D2, which here is assumed to be the case) the data (respectively D2 or D2N) will be passed on by way of the output "YES" of the comparator and of the branch 41.2.

After completion of the data in the cycle N+1 in step 42.1, 42.2 there will be the data transfer from system MC2 to system MC1. The result determined in the comparator 43.1 in this instance will reveal differences as there was an interference in the transmission path.

At least some of the compared data differed. Thus, according to this invention, in the circuit system MC1 the transferred data D2'N+1, at least the differing data of this package, will be taken over by the command stage 44 into the data processing of the system MC1. The subsequent further processing of the data in cycle N+2 illustrated by block 45.1 thus will be performed on the basis of (partially) wrong data. The following transfer of the results D2'N+2 or of certain data of this package, respectively, into the circuit system MC2 as well as the comparison of the transferred data with the corresponding values of the package D2N+2, consequently, again will reveal differences. Therefore, the transferred data will be taken over in the system MC2 by means of operation 47 and data processing will be continued with the data. After this take-over the data in the two systems MC1 and MC2 again will be identical so that the subsequent further processing in cycle N+3(block 48.1, 48.2) again will lead to consistent data. After a new transfer of the data from system MC2 to system MC1 the agreement can be proved by the comparator 49.1.

In a method and a circuit configuration of the described type relating, for example, to the electronic control circuit for a slip-controlled brake system described with reference to FIG. 1, the effect on a transmission error will be eliminated automatically in the data exchange between the parallel-working circuit systems after a few cycles if the interference was actually only a sporadic interference and not a real error or a lasting interference, which would cause and signalize differences in the comparison of data over numerous cycles. In applying the inventive method, thus, when there is an interference, the data processing will be continued without hindrance for the time being until the number of cycles in which the comparator reveals differences exceeds a predetermined scope or a predetermined value. In this way it is possible to reduce the tolerance computationally or empirically to an adequate value without the reliability or the reactivity of the system (such as, for example, impairing a brake system) with regard to real defects being impaired as only short interferences are suppressed which pratically have no influence on the data processing or slip control.

Figure 4:
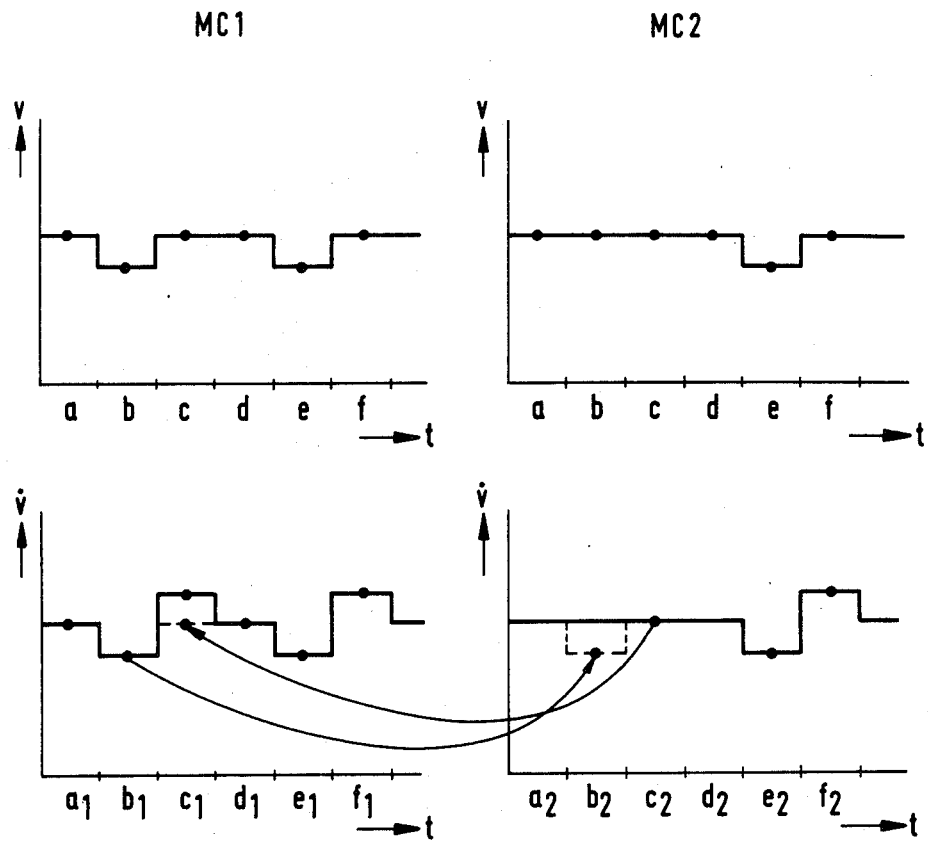

FIG. 4 illustrates the automatic correction of the described system when the inventive method is applied. Illustrated as example in FIG. 4 in six consecutive cycles a through f is the digital velocity signal v as well as the acceleration or deceleration $\dot{v}$ derived from said signal, and this again with parallel data processing in the two circuit systems MC1 and MC2.

In cycle $b_1$ the example in FIG. 4 the velocity signals in the two systems MC1, MC2 differ due to a transmission error, for example. In the derived acceleration signal or derived deceleration signal $\dot{v}$, and in two consecutive cycles b and c, the interference in the velocity signal leads to a different data flow or rather to differences when comparing the data transferred from one system (MC1 or MC2) to the other one (respectively MC2 or MC1). Thus, according to this invention, as indicated by the loops between the $\dot{v}$ diagrams, in cycle b the $\dot{v}$ value of the system MC1 is taken over by the system MC2 and is further processed. In cycle c the transfer and take-over of the differing data take place in the reverse direction—i.e., from c2 to c1. In the subsequent cycle d the situation is already back to normal, the effect of the interference having been stopped.

In order to suppress the interference in the velocity signal, in the example according to FIG. 2 it is sufficient to rate the system so that, in case of differences in the results of the comparisons of two consecutive cycles, there will not be any indication or reaction. This, however, only applies to this example. If, for instance, higher time derivatives are formed in the systems, in order to suppress a sporadic error it may be necessary to increase the scope of tolerance until there will be an indication of an interference. It is relatively easy to computationally or empirically determine the number of consecutive cycles in which differences in the data comparison are tolerable.

What is claimed is:

1. A method for suppressing sporadic, short-time interferences in the processing of signals and data by means of electronic time-dependent computing, selecting, and combining circuits or of program-controlled circuits such as microprocessors or microcomputers, in which method the data are redundantly processed in two circuit systems, which are independent of each other, and in which method the data are cyclically exchanged for the detection of errors and thereby interferences, and alternatively transferred from one system to the other, and compared for agreement, said method comprising the steps of: continuing the data processing on the basis of the transferred data in case of differences between the compared data (D1n, D2n), and between the transferred data and the data momentarily existing in the system (MC1, MC2); and, inhibiting the indication or reaction to the interference until differences have been detected between the compared data (D1n, D2n) of the two systems (MC1, MC2) in a predetermined number of program cycles.

2. A method as claimed in claim 1, wherein in case of only a partial agreement of the transferred data with the existing data, only the differing data is taken over.

3. A method as claimed in claim 1, wherein an interference is not indicated until differences have been detected between the compared data (D1n, D2n) of the two systems (MC1, MC2) in a predetermined number of consecutive program cycles.

4. A method as claimed in claim 1, wherein an interference is not indicated until differences have been detected between the compared data (D1n, D2n) of the two systems (MC1, MC2) in a predetermined number of program cycles per unit of time.

5. A method as claimed in claim 4, wherein the transferred data is compared each time with the stored data detected in the preceding program cycle.

6. A method as claimed in claim 5, wherein in at least three circuit systems which are independent of one another, the data are processed in parallel, cyclically exchanged, and compared for agreement and wherein the data processing is continued on the basis of the transferred data in case of no agreement or only a partial agreement of the transferred data with the existing data.

7. A circuit configuration for controlling a slip-controlled brake system for automotive vehicles, said configuration comprising transducers and means for deriving electrical signals representative of the wheel rotational behavior, and an electronic control circuit including two electronic circuit systems and serving to redundantly process said electrical signals derived from the wheel rotational behavior, which systems are independent of each other and which are synchronizable, and said control circuit generating braking pressure control signals, with the control signals being cyclically exchangeable between said two circuit systems, and thereby alternatively transferrable from one system to the other from cycle to cycle, and a plurality of comparators for determining agreement between the control signals, wherein in case of differences between the control signals fed to the comparators (15, 16, 25', 41.2, 43.1, 46.2, 49.1) as in case of partial agreement between the transferred control signals and the control signals momentarily existing in the system, the circuit systems (2, 3, MC1, MC2) take over the transferred control signals and continue the control signals processing with said transferred control signals and wherein an interference will not be indicated until a repeated difference between the transferred and existing control signals.

8. A circuit configuration as claimed in claim 7, in case of but a partial agreement of the transferred control signals with the existing control signals, the circuit systems (2, 3, MC1, MC2) will take over the differing control signals only and continue the control signals processing with said differing control signals.

9. A circuit configuration as claimed in claim 7, wherein an interference is indicated after a predetermined number of consecutive program cycles in which the transferred control signals differ from the existing control signals.

10. A circuit configuration as claimed in claim 7, wherein an interference is indicated after a predetermined number of program cycles per unit of time, in which the transferred control signals differ from the existing control signals.

11. A circuit configuration as claimed in claim 10, wherein each circuit system (2, 3, MC1, MC2) is connected with an evaluation circuit (21, 22) and with a monitoring circuit (23, 24) which partially or completely stops the control circuit (ER) when an interference is signalized.

12. A circuit configuration as claimed in claim 11, wherein the evaluation and monitoring circuits (21–24) disable the control circuit (ER) for a predetermined period.

13. A circuit configuration as claimed in claim 11, wherein the monitoring circuits (23, 24) inhibit the control circuit (ER) until a manual or automatic release of a starting command.

14. A circuit configuration as claimed in claim 11, wherein the monitoring circuits (23,24) interrupt the electric power supply ($U_B$) of the control circuit (ER).

* * * * *